May 5, 1925.
G. F. WILSON ET AL
VEHICLE BUMPER
Filed Oct. 20, 1923
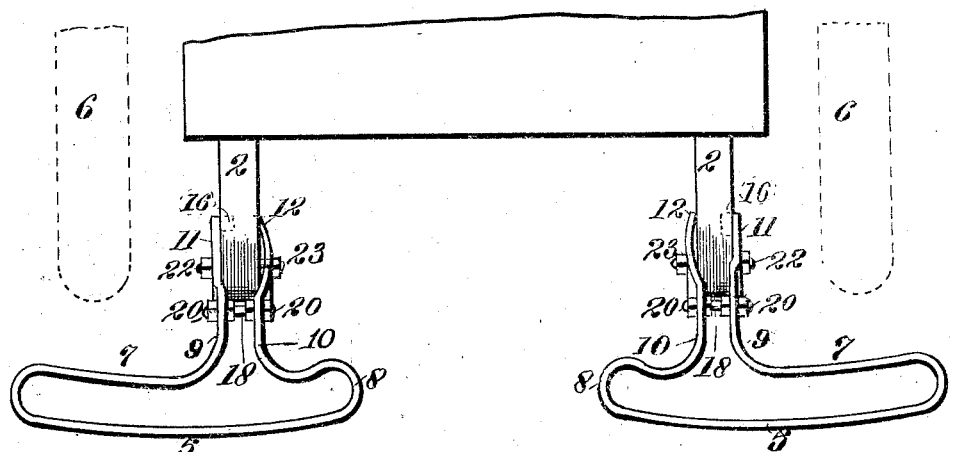
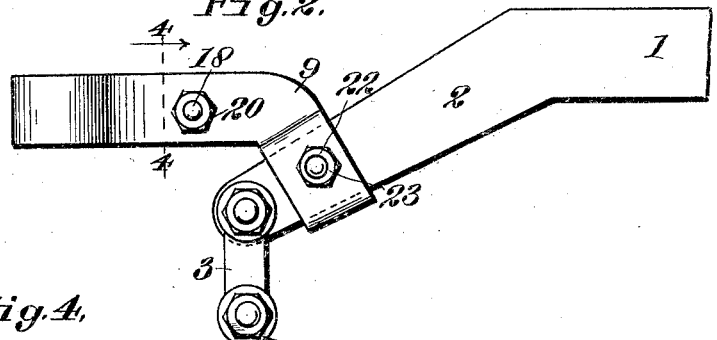
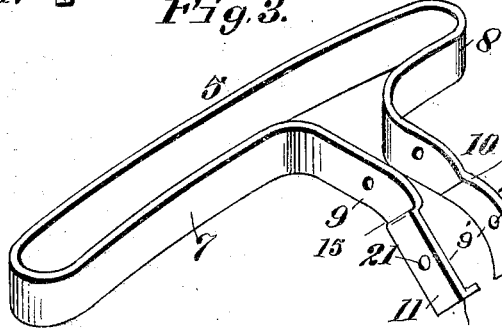
Inventors.
G. F. Wilson
L. M. Gold
By Cicero & Totten,
Attorneys.

Patented May 5, 1925.

1,536,547

UNITED STATES PATENT OFFICE.

GEORGE F. WILSON AND LOUIS M. GOLD, OF SACRAMENTO, CALIFORNIA.

VEHICLE BUMPER.

Application filed October 20, 1923. Serial No. 669,702.

*To all whom it may concern:*

Be it known that we, GEORGE F. WILSON and LOUIS M. GOLD, citizens of the United States, residing in the city of Sacramento, in the county of Sacramento and State of California, have invented certain new and useful Improvements in Vehicle Bumpers, of which the following is a specification.

This invention relates to what may be commonly termed quarter bumpers for vehicles, and particularly to a type primarily designed for mounting at the rear of the vehicle.

Among the objects of this invention are to provide a bumper construction for the rear of the vehicle which will protect the fenders, and at the same time permit access to be had to the gasoline tank and also to the spare tire rack when the same is carried at the rear of the vehicle.

A further object is to provide a construction wherein the two quarter bumpers protect the rear of the vehicle from damage and at the same time do not extend completely across or transversely of the same.

The invention consists primarily in a bumper of strap material having an impact portion and curved portions of different lengths to form the bumper with legs of different lengths whereby, on the attachment of the bumper to a vehicle horn, the leg of greater length will project outwardly to protect the vehicle fender, and the short leg will project inwardly and fall short of extending to the longitudinal center of the vehicle frame.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 1 is a view in plan of a portion of a vehicle with the preferred embodiment of our invention applied thereto.

Figure 2 is a view in side elevation.

Figure 3 is a view in perspective of one of the bumpers removed from the vehicle, and Figure 4 is a sectional view on line 4—4 Figure 2.

In the embodiment illustrated, the ends of the frame 1 terminating in the conventional downwardly inclined horns 2 connect through the shackle 3 or directly with the end of the vehicle springs 4. The bumpers are two in number as illustrated, one carried by each horn, and the same being duplicates, a description of but one is thought will suffice. Each consists of a strap of flat spring steel or other suitable metal bent to shape, and preferably consisting of a slightly convex impact reach 5 of a length to project at one end beyond the tire 6 and at the other end to extend a slight distance beyond the inner edge of the frame horn 2 which mounts the same. The reach 5 terminates in ogee spring bends 7 and 8 which approach each other, and which in turn terminate in straight parallel spaced supporting arms 9 and 10. The bend 7 is of a length greater than the bend 8 thus disposing arms 9 and 10 at one side of the longitudinal center of the reach 5 as illustrated. The supporting arms 9 and 10 terminate in downwardly inclined engaging arms 11 and 12, designed to extend transversely across the side walls of the horn, as in Figure 2, when the bumper is in position and to dispose the supporting arms in a substantially horizontal plane. Within their length the engaging arms are outwardly bent providing at their opposite ends engaging shoulders or portions 15 and 16 for gripping opposite corners of opposite faces of the horn when the arms are positioned to embrace the same. In the embodiment illustrated, the arm 11 is bent outwardly forming a portion disposed in a plane offset from its supporting arm 9 and connected therewith by right angularly disposed portions 9', and the other arm is outwardly curved in the opposite direction, but it is to be understood that the bends and curves illustrated are designed for a particular installation, and that the form of the bend may be of any suitable shape just so long as the shoulders 15 and 16 are afforded. The arms 9 and 10 are normally held apart by the spacing nuts 17 carried by a threaded member 18 passing through the same, and said arms are held in contact with said nuts 17 by clamp nuts 20 also threaded onto the member 18. Each of the engaging arms 11 and 12 is formed with an opening 21 disposed in alignment for receiving a securing bolt 22 passing transversely through the horn and for receiving a clamping nut 23.

It will be observed that the present form of bumper is designed particularly for use on the rear of a vehicle to permit access to be had to the spare tire and gasoline tank. However, the same is equally as well adapted for use at the front of the vehicle to protect the frame, fenders and walls, and to permit ready use of the starting crank when the same is necessary.

We claim:—

1. For use with an automobile having a frame provided with downwardly inclined horns at its end, a bumper comprising in part a pair of attaching portions for embracing a horn, said attaching portions being inclined downwardly from their associated supporting arms, one of said attaching portions being outwardly curved to afford a resilient clamp and the other being angularly bent outwardly providing between them an enlarged recess for receiving opposite sides of the horn, said curved and bent portions affording horn engaging flanges at their opposite terminals, and means passing through said attaching portions and said horn to secure the bumper thereto with said supporting arms substantially horizontally disposed.

2. For use with an automobile having a frame provided with downwardly inclined horns at its end, a bumper comprising in part a pair of supporting arms, an attaching portion disposed at a downward inclination rearwardly from each to embrace a horn and to extend at right angles across opposite sides thereof and dispose the supporting arms in a substantially horizontal plane, said attaching portions being bent outwardly to provide a recess for receiving the horn and to afford shoulders for resting on the opposite sides of the upper surface thereof, and means for passing through said attaching portions and horn for securing the bumper to the vehicle frame.

3. An automobile bumper comprising a one piece impact member having recurved ends of different length bent rearwardly to provide adjacent parallel supporting arms extending from the rear of the bumper at a point offset from the horizontal center of the impact member, said arms at their terminus being downwardly inclined forming engaging arms adapted to extend at right angles across the downwardly inclined horn of an automobile frame and to straddle the same with the supporting arms in a substantially horizontal position, said engaging arms formed with shoulders for engaging the upper and lower opposite corners of the horn when straddling the same, and means passing through the engaging arms and horn for securing the bumper in position.

In testimony whereof we have signed our names to this specification.

GEORGE F. WILSON.
LOUIS M. GOLD.